United States Patent [19]

Tsuzuki et al.

[11] Patent Number: 5,057,734
[45] Date of Patent: Oct. 15, 1991

[54] APPARATUS FOR DRIVING PIEZOELECTRIC ELEMENT FOR CLOSING AND OPENING VALVE MEMBER

[75] Inventors: Naoyuki Tsuzuki; Masaki Mitsuyasu, both of Susono; Takeshi Takahashi, Mishima, all of Japan

[73] Assignee: Toyota Jidosha Kabushiki Kaisha, Toyota, Japan

[21] Appl. No.: 443,220

[22] Filed: Nov. 29, 1989

[30] Foreign Application Priority Data

Nov. 30, 1988 [JP] Japan .......................... 63-154887[U]
Jan. 11, 1989 [JP] Japan ........................................ 1-2876

[51] Int. Cl.⁵ .......................... H01L 41/08; B05B 3/14
[52] U.S. Cl. .................................... 310/317; 310/316; 123/478; 123/498
[58] Field of Search ............... 310/316, 317; 318/116, 318/118; 123/478, 494, 498, 642

[56] References Cited

U.S. PATENT DOCUMENTS

| 4,644,212 | 2/1987 | Moritugu et al. | 310/317 |
| 4,705,003 | 11/1987 | Sakakibara | 310/317 X |
| 4,732,129 | 3/1988 | Takigawa et al. | 310/316 X |

FOREIGN PATENT DOCUMENTS

| 59-58129 | 4/1984 | Japan . |
| 60-237869 | 11/1985 | Japan . |
| 61-180581 | 8/1986 | Japan . |
| 62-142845 | 6/1987 | Japan . |
| 62-240449 | 10/1987 | Japan . |
| 63-230940 | 9/1988 | Japan . |

Primary Examiner—Mark O. Budd

[57] ABSTRACT

In an apparatus for driving a piezoelectric element used for closing and opening a valve member, a first-step voltage is applied to the piezoelectric element to move the valve element near to a valve seat, and thereafter, a second-step voltage higher than the first-step voltage is applied to the piezoelectric element to seat the valve element securely on the valve seat.

14 Claims, 16 Drawing Sheets

PRIOR ART
Fig.10A  $S_1$(CLOSE)
Fig.10B  $S_2$(OPEN)
Fig.10C  $V_{PZT}$
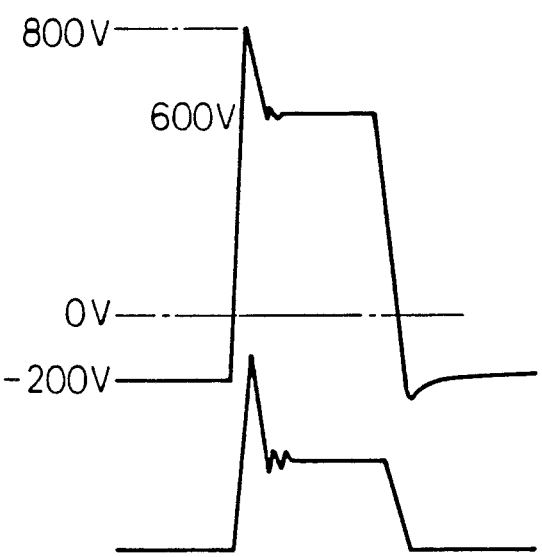
Fig.10D  P
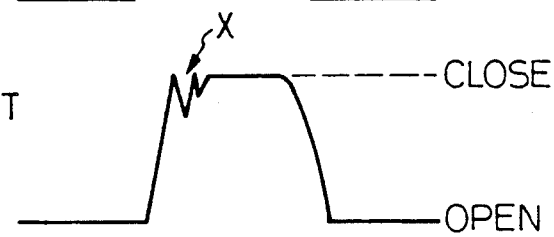
Fig.10E  DISPLACEMENT OF VALVE MEMBER

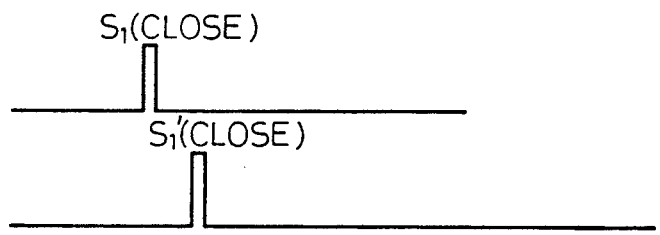
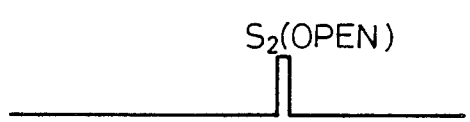
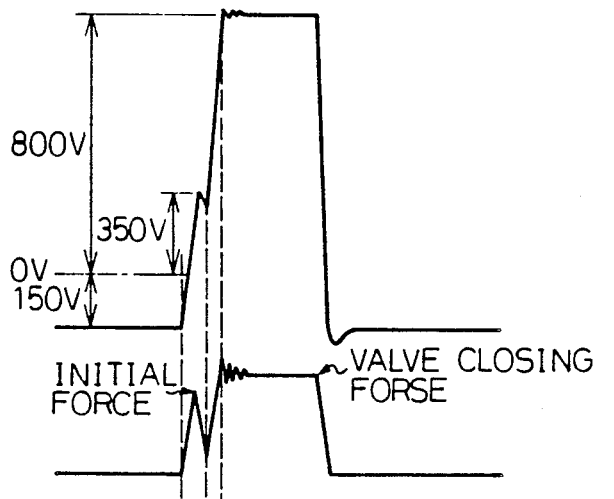
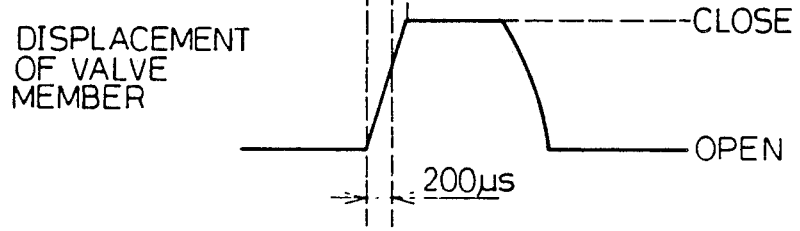

APPARATUS FOR DRIVING PIEZOELECTRIC ELEMENT FOR CLOSING AND OPENING VALVE MEMBER

BACKGROUND OF THE INVENTION

1. Field of the Invention

The present invention relates to an apparatus for driving a piezoelectric element which is used as a fuel injection valve of a gasoline engine, a diesel engine, or the like.

2. Description of the Related Art

A high response characteristic piezoelectric element is applicable to an actuator of a fuel injection apparatus of a gasoline engine, a diesel engine, and the like (see: Unexamined Japanese Patent Publication (Kokai) Nos. 60-249877 and 62-17338). For example, there is suggested a fuel injection apparatus which includes a plunger driven by an engine; a fuel pressure chamber filled with fuel and pressurized by the plunger; a needle move in response to a fuel pressure within the fuel pressure chamber, the needle being opened when the fuel pressure is larger than a predetermined pressure; an overflow valve associated with a valve member which is slidably inserted into a slidable hole and is controlled by the pressure within a pressure control chamber arranged coaxially with the slidable hole; and a variable volume chamber connected to the pressure control chamber and changed by an actuator, to thereby close the overflow valve to shut off the fuel from the fuel pressure chamber when the volume of the variable volume chamber is reduced, to increase the pressure within the pressure control chamber.

In the above-mentioned fuel injection apparatus, however, to initiate a fuel injection, when the volume of the variable volume chamber is reduced to increase the pressure within the pressure control chamber, the overflow valve associated with the valve member is moved at a high speed, and thereafter, the overflow valve is rapidly moved on to a valve seat. As a result, although the overflow valve and the valve member are closed at the same time, the overflow valve and the valve member bounce and thus do not remain on their valve seats, whereby the overflow valve is again opened. Therefore, since an overflow of the fuel in the fuel pressure chamber occurs, the fuel injection pressure can not smoothly rise to a high pressure.

SUMMARY OF THE INVENTION

Therefore, an object of the present invention is to avoid jumping (bouncing) of the valve member (i.e., the overflow valve) when the valve is closed.

According to the present invention, there is provided an apparatus for driving a piezoelectric element to transmit a displacement of the piezoelectric element via a liquid to a valve member to thereby close and open a valve, comprising; a high DC voltage generating means; a charging switching means, connected to the high DC voltage generating means and the piezoelectric element, for generating a first voltage and applying it to the piezoelectric element for a predetermined time so that the valve member is brought near to a valve seat, and thereafter, increasing an applied voltage to the piezoelectric element from the first voltage to a second voltage higher than the first voltage, so that the valve member is seated on the valve seat, to thereby close said valve; and a discharging switching means, connected to the piezoelectric element, for discharging charges stored in the piezoelectric element to open the valve.

That is, in the above-mentioned apparatus, a first-step voltage such as 350 V is applied to the piezoelectric element to move the valve member near to the valve seat, and thereafter, a second-step voltage such as 800 V higher than the first-step voltage is applied to the piezoelectric element to seat the valve member securely on the valve seat.

BRIEF DESCRIPTION OF THE DRAWINGS

The present invention will be more clearly understood from the description as set forth below, with reference to the accompanying drawings, wherein:

FIGS. 10A through 10B are timing diagrams showing the operation of the circuit of FIG. 9;

FIGS. 12A through 12F are timing diagrams showing the operation of the circuit of FIG. 11;

DESCRIPTION OF THE PREFERRED EMBODIMENTS

Figure 1:
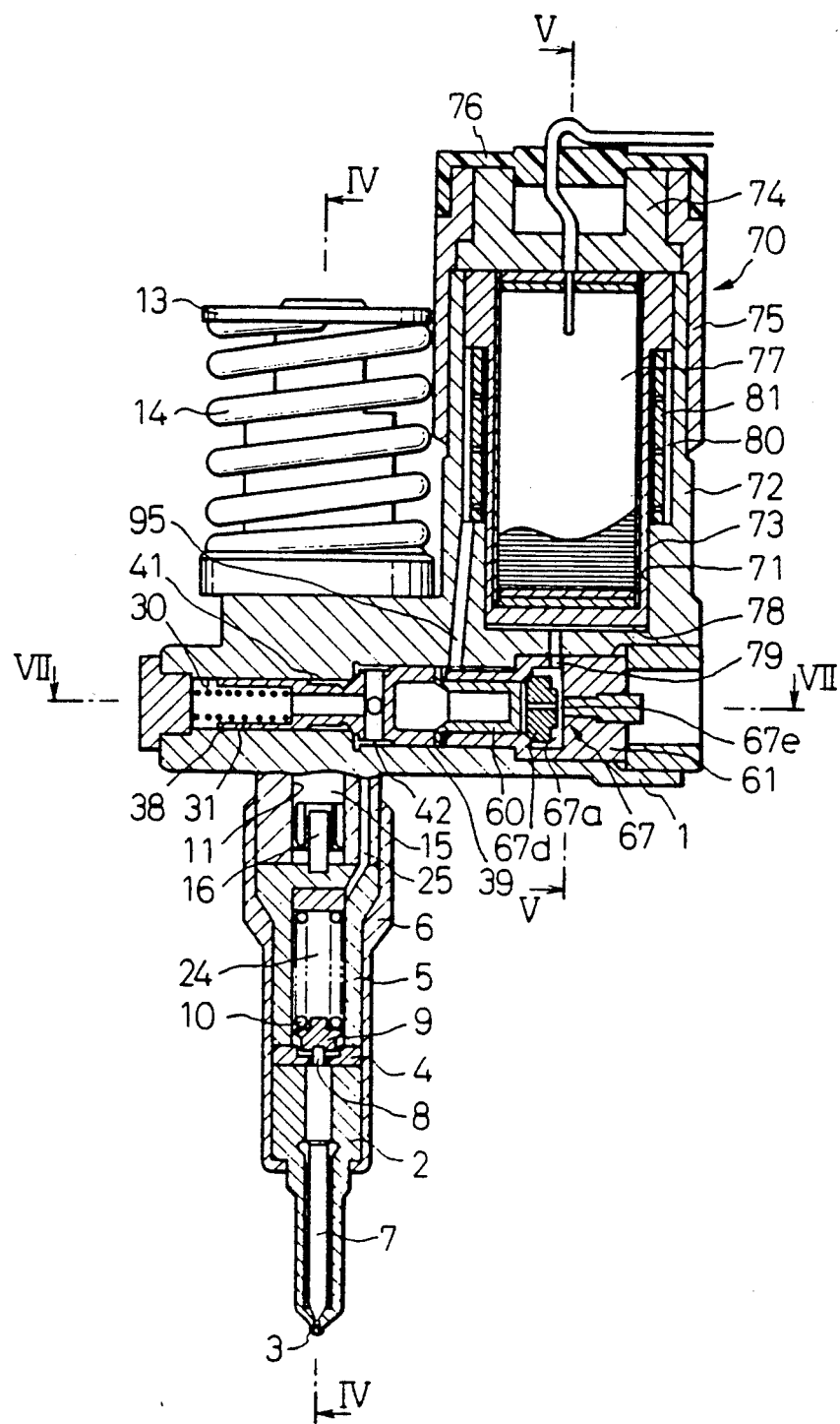
FIG. 1 is a cross-sectional view of a fuel injection apparatus of FIG. 4 according to the present invention taken along the line I—I thereof.

First, a fuel injection apparatus according to the present invention, to which an apparatus for driving a piezoelectric element is applied, will be explained with reference to FIGS. 1 through 7.

Referring to FIGS. 1 to 4, 1 designates a housing body; 2 a nozzle having a nozzle hole 3 on an end thereof; 4 a spacer; 5 a sleeve; and 6 a nozzle holder for fixing the nozzle 2, the spacer 4, and the sleeve 5 to the housing body 1. A needle 7 is slidably inserted in the nozzle 2 to control the opening and closing of the nozzle hole 3, and the top of the nozzle 7 is connected, via a pressure pin 8, to a spring retainer 9. This spring retainer 9 is always biased downward by a compression spring 10, and this biasing force is transmitted, via the pressure pin 8, to the needle 7. Therefore, the needle 7 is always urged toward the closing direction by the compression spring 10.

Figure 3:
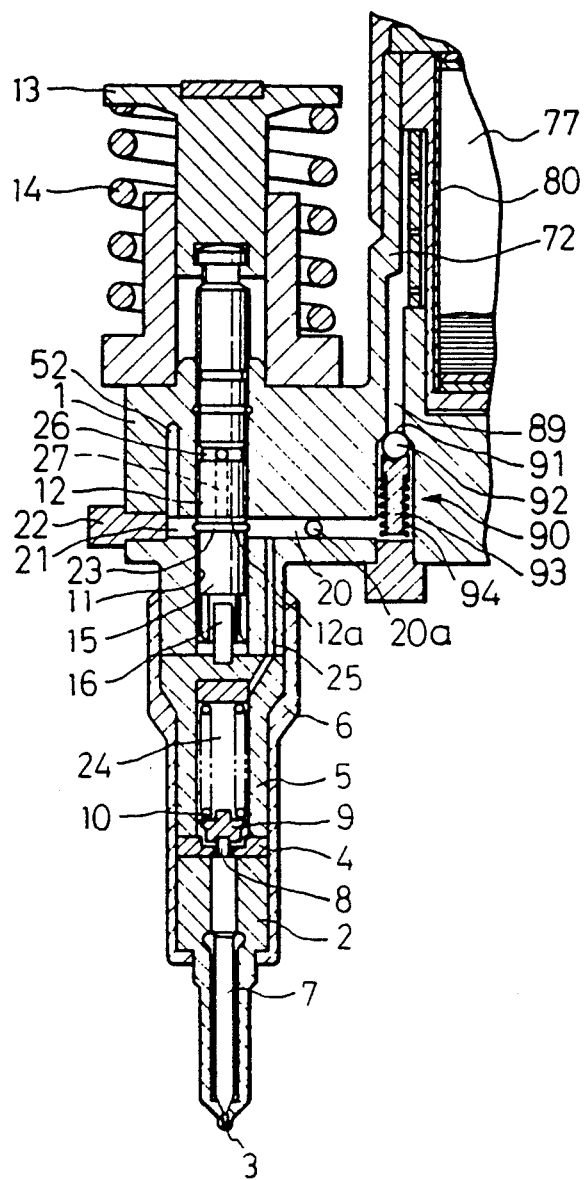
FIG. 3 is a cross-sectional view taken along the fine III—III of FIG. 4.

Further, a plunger hole 1 is formed coaxially with the needle 7, and a plunger 12 is inserted slidably into the plunger hole 11. An upper end of the plunger 12 is connected to a tappet 13 which is always biased upward by a compression spring 14. This tappet 13 is moved up and down by a cam (not shown) driven by the engine, and accordingly, the plunger 12 is moved up and down within the plunger hole 11. Furthermore, a fuel pressure chamber 15 is formed in the plunger hole 11 below the plunger 12, defined by a lower end face 12a thereof. This fuel pressure chamber 15 is connected, via a rod-type filter 16 and a fuel passage 17 (FIG. 4), to a needle pressure chamber 18 connected, via a ring-shaped fuel passage 19, to the nozzle hole 3. Also, as shown in FIG. 3, when the plunger 12 is located at an upper position, a fuel supply port 20 opening to the fuel pressure chamber 15 is formed, so that fuel having a feed pressure of about 2 to 3 kg/cm$^2$ is supplied from the fuel supply port 20 to the fuel pressure chamber 15. This fuel supply port 20 is connected via a fuel exhaust passage 20a extending perpendicular to the fuel supply port 20 and the relief valve (not shown), to the fuel tank (not shown). Also, as shown in FIG. 3, in view of forming a passage in the injection apparatus, another fuel port is formed on the opposite side of the fuel supply port 20 with respect to the plunger hole 11, and an external end of this fuel port 21 is closed by a blind plug 22. This fuel port 21 is extended coaxially with the fuel supply port 20 and leads to the plunger hole 11. Provided inside of the plunger hole 11 is a circular groove 23 extending from the fuel supply port 20 to the fuel port 21. Therefore, when the plunger 12 descends to close the connection between the fuel supply port 20 and the fuel port 20, the fuel supply port 20 and the fuel port 21 are connected via the circular groove 23, whereby the fuel pressure within the fuel port 21 is retained at the same feed pressure as that at the fuel supply port 20. A compression spring accommodating chamber 24 for accommodating the compression spring 10 for biasing the needle 7 is connected via a fuel return passage 25 to the fuel supply port 20, and therefore, any leakage of fuel into the compression spring accommodating chamber 24 is returned via the fuel return passage 25 to the fuel supply port 20. Further, a circular groove 26 is formed on the periphery of the plunger 12 immediately above a plunger lower surface 12a, and the circular groove 26 is connected, via a fuel relief hole 27 formed in the plunger 12, to the fuel pressure chamber 15.

Figure 2:
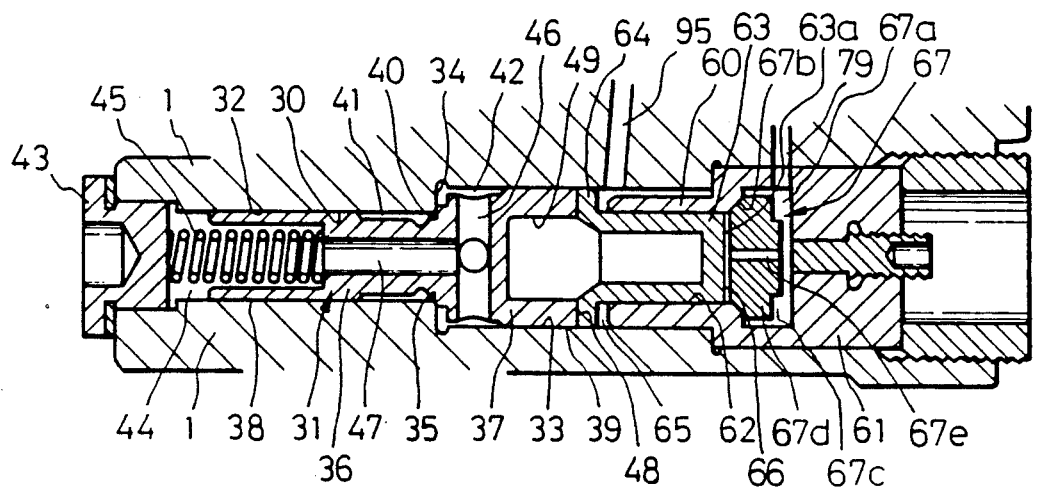
FIG. 2 is a partly enlarged cross-sectional side view of FIG. 1.

Furthermore, a slidable hole 30 is formed traversely within the housing body 1, on the periphery of the plunger hole 11. Namely, this slidable hole 30 is arranged and spaced in parallel to a line approximately perpendicular and coaxial to the axes of the plunger 12 and the needle 7. An overflow valve 31 is slidably inserted into the slidable hole 30. As shown in FIGS. 1 and 2, the slidable hole 30 has a small-radius hole 32 and a large-radius hole 33 arranged coaxially to each other, and a step portion 34 is formed perpendicular to the common coaxial line of the small-radius hole 32 and the larger-radius hole 33. A ring-shaped valve seat 35 is formed at the connection portion of the step portion 34 and the small-radius hole 32. Moreover, the overflow valve 31 has a small-radius portion 36 located within the small-radius hole 32 and a larger-radius portion 37 located within the small-radius hole 33. A first ring-shaped fitting portion 38 is formed at an external end portion of the small-radius portion 36, to be in close contact with the inner wall of the small-radius hole 32, and a second ring-shaped fitting portion 39 is formed at an external end portion of the larger-radius portion 37, to be in close contact with the inner wall of the larger-radius hole 33. A ring-shaped valve portion 40 is formed on the external circumference of the overflow valve 31 between the first and second ring-shaped fitting portions 38 and 39, and can be seated on the valve seat 35. A ring-shaped pressured fuel introducing chamber 41 is formed on an external circumference of the overflow valve 31 between the ring-shaped valve portion 40 and the first ring-shaped fitting portion 38, and a ring-shaped fuel overflow chamber 42 is formed on an external circumference of the overflow valve 31 between the ring-shaped valve portion 40 and the second ring-shaped fitting portion 39. As shown in FIG. 2, the radius of the external circumference of the large-radius portion 37 defining the fuel overflow chamber 42 is larger than that of the small-radius portion 32, and therefore, the volume of the fuel overflow chamber 42 is very large. An external end portion of the small-radius portion 32 is closed y a blind plug 43, and an overflow valve back pressure chamber 44 is formed between the blind plug 43 and the overflow valve 31. In this overflow valve back-pressure chamber 44, a compression spring 45 is provided to separate the ring-shaped valve portion 40 of the overflow valve 31 from the valve seat 35, i.e., to activate the overflow valve 3 to move in the valve open direction. A fuel passage 46 opening to the fuel overflow chamber 42 is provided along the radial direction within the large-radius portion 37 of the overflow valve 31. A fuel passage 47 opening to the overflow valve back-pressure chamber 44 is provided along the axial direction within the small-radius portion 36. These fuel passages 46 and 47 are connected to each other within the overflow valve 31, and therefore, the overflow valve back-pressure chamber 4 is connected, via the fuel passages 46 and 47, to the fuel overflow chamber 42. A concave groove 49 is formed at the middle of an end surface 48 of the overflow valve 31 on the second ring-shaped fitting portion 39, and therefore, since the concave groove 49 and the fuel passages 46 and 47 are provided in the overflow valve 31, the mass of this overflow valve 31 is very small.

Figure 4:
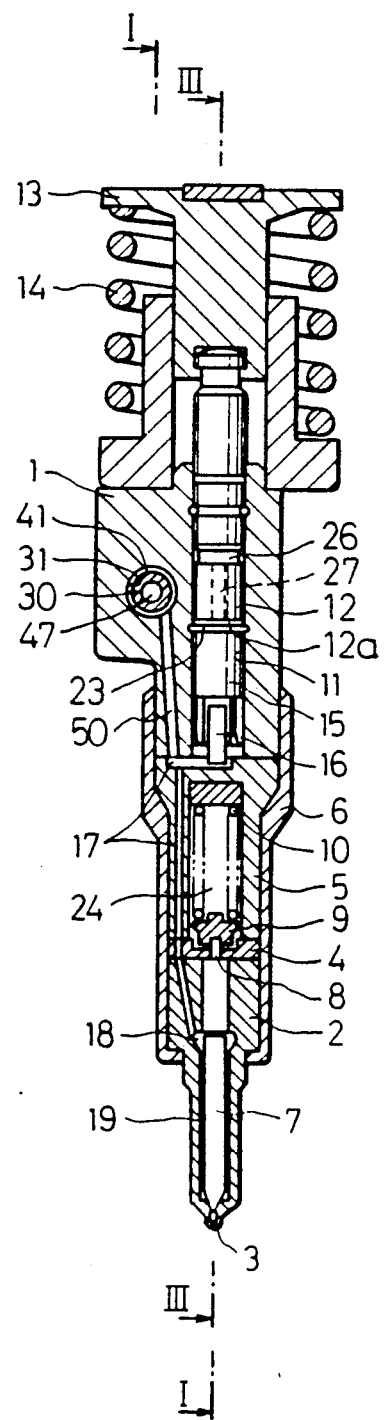
FIG. 4 is a cross-sectional side view taken along the line IV—IV of FIG. 1.
Figure 7:
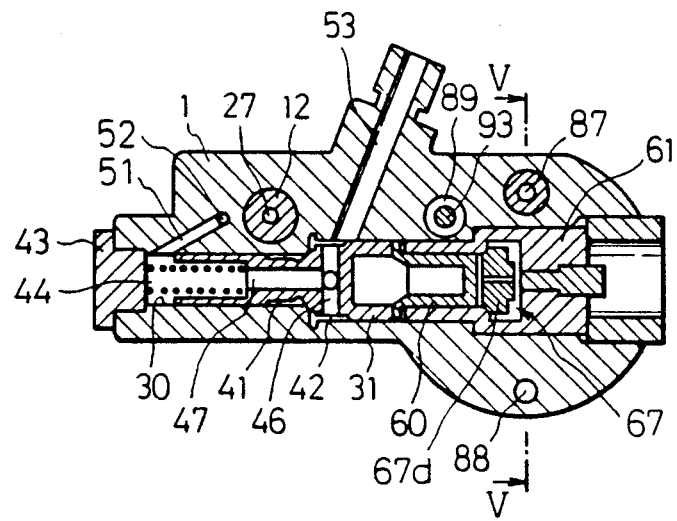
FIG. 7 is a cross-sectional plan view taken along the line VII—VII of FIG. 1.

As shown in FIG. 4, a fuel overflow passage 50 extending from the fuel passage 17 and leading to the pressurized fuel introducing chamber 41 is formed in the housing body 1. This fuel overflow passage 50 is always connected to the fuel pressure chamber 15, and therefore, the pressurized fuel introducing chamber 41 is always connected to the fuel pressure chamber 15. Also, as shown in FIG. 7, the overflow valve back-pressure chamber 44 is connected, via the fuel passage 51, to the fuel passage 52 extending along the perpendicular direction in FIG. 7, and as shown in FIG. 3, a lower end portion of this fuel passage 52 is connected to the fuel port 21. Further, as shown in FIG. 7, the fuel overflow chamber 42 is connected to the fuel exhaust passage 53, and fuel flowing out of the fuel exhaust passage 53 is returned to the fuel tank (not shown).

As shown in FIGS. 1 and 2, a rod guide 61 for guiding a rod 60 is provided at an external end portion of the large-radius hole 33 of the slidable hole 30. This rod guide 61 has a rod hole 62 fitted therein. The rod 60 has a hollow cylindrical small-radius portion 63 slidably inserted into the rod hole 62, and a large-radius portion 64 slidably inserted into the large-radius hole 33, and an end surface of the large-radius portion 64 abuts against the end surface 48 of the overflow valve 31. A rod back-pressure chamber 65 is formed between an internal end portion of the rod guide 61 and the large-radius portion 64 of the rod 60. A pressure control chamber 66 defined by an end surface 63a of the small-radius portion 63 is provided at an end portion of the rod 60 opposite to the large-radius portion. As shown in FIGS. 1 and 2, the rod 60 is hollow and cylindrical, and therefore, the mass of the rod 60 is very small.

Further, a pressure control mechanism 67 is arranged adjacent to the pressure control chamber 66. This pressure control mechanism 67 has a valve chamber 67a coaxially arranged with the pressure control chamber 66, a ring-shaped valve seat 67b formed in the connection portion of the pressure control chamber 66 and the valve seat 67a, and a valve member 67d which can be seated on the valve seat 67 by a compression spring 67c. A throttle passage 67e connecting the pressure control chamber 66 to the valve chamber 67a is provided in the valve member 67d, and an actuator 70 is arranged above the valve chamber 67a.

Figure 5:
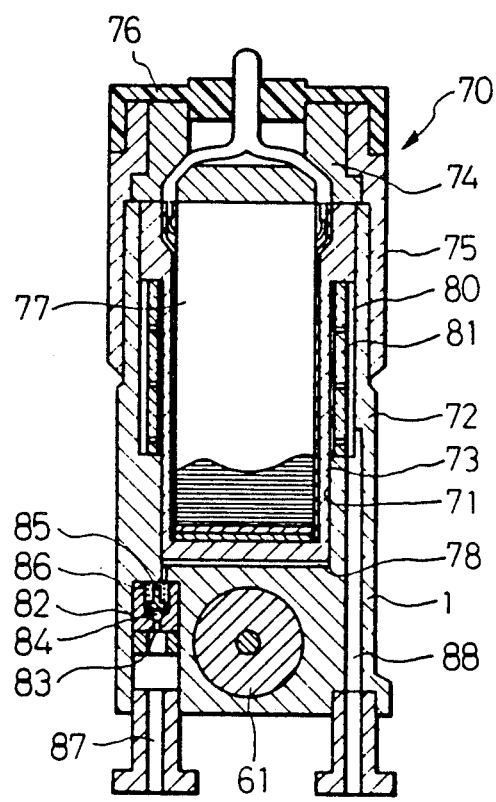
FIG. 5 is a cross-sectional side view taken along the line V—V of FIG. 1 and the line V—V of FIG. 7.
Figure 6:
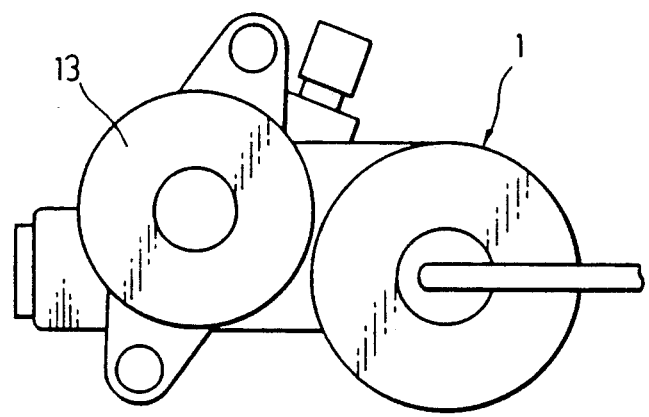
FIG. 6 is a plan view of FIG. 1.

As shown in FIGS. 1 and 5 the actuator 70 has an actuator housing 72 formed as one body with the housing body 1 and having a piston hole 71 therein, a piston 73 slidably inserted into the piston hole 71, a terminal plate 74 covering a top portion of the actuator housing 72, an end plate holder 75 for fixing the end plate 74 to the top of the actuator housing 72, and a synthetic resin cap 76 covering the upper end portion of the terminal plate 74. A piezoelectric element 77 having a large number of laminated piezoelectric plates is inserted between the piston 73 and the end plate 74, and a variable volume chamber 78 defined by the lower end surface of the piston 73 is formed within the piston hole 73 below the piston 71. This variable volume chamber 78 is connected, via a fuel passage 79, to the valve chamber 67d. A ring-shaped cooling chamber 80 is formed between the piston 73 and the actuator housing 72. Also, a compression spring 81 for always activating the piston 71 upward is inserted within the cooling chamber 80. When the piezoelectric element 77 is changed, the piezoelectric element 77 expands along the axial direction thereof, to reduce the volume of the variable volume chamber 78. Further, when the piezoelectric element 77 is discharged, the piezoelectric element 77 contracts along the axial direction thereof, to increase the volume of the variable volume chamber 78.

As shown in FIG. 5, a check valve 82 is inserted into the housing body 1. This check valve 82 has a ball 84 for controlling the opening and closing of a valve port 83, a rod 85 for defining the amount of lift of the ball 84, and a compression spring 86 for always biasing the ball 84 and the rod 85 downward, i.e., the valve port 83 is usually closed. The valve port 83 of the check valve 82 is connected, via a fuel inlet passage 87, to the low pressure fuel pump (not shown), and therefore, fuel having a low pressure of 2 to 3 kg/cm$^2$ is supplied from the fuel inlet passage 87. The check valve 82 can allow a flow of fuel only toward the fuel inlet passage 87, and therefore, when the fuel pressure within the variable volume chamber 78 becomes lower than 2 to 3 kg/cm$^2$, fuel is replenished via the check valve 82, in the variable volume chamber 78. Therefore, the variable volume chamber 78, the valve chamber 67a, and the pressure control chamber 66 are always filled with fuel. Further, as shown in FIG. 5, a lower end of the cooling chamber 80 is connected via a fuel inlet passage 88 to the low pressure fuel pump (not shown), so that fuel having a low pressure of 2 to 3 kg/cm$^2$ is supplied from the fuel inlet passage 88 to the cooling chamber 80, to thereby cool the piezoelectric element 77. Also, as shown in FIG. 3, the lower end of the cooling chamber 80 is connected via a fuel exhaust passage 89 to the fuel supply port 20, and a check valve 90 is provided in the fuel supply port 20. As a result, fuel is fed from only the cooling chamber 80 to the fuel supply port 20. This check valve 90 has a ball 92 for controlling the opening and closing of a valve port 91, a rod 93 for defining the amount of lift of the ball 92, and a compression spring 94 for always biasing the ball 92 and the rod 93 downward. The fuel in the cooling chamber 80 cools the piezoelectric element 77, and thereafter, is supplied via the fuel exhaust passage 89 to the fuel supply port 20. Also, as shown in FIGS. 1 and 2, the lower end of the cooling chamber 80 is connected via a fuel passage 95 to the rod back-pressure chamber 65, and therefore, the chamber 65 is filled with fuel at a pressure of 2 to 3 kg/cm$^2$.

As explained above, fuel is supplied via the fuel inlet passage 88 to the cooling chamber 80, and thereafter, this fuel cools the piezoelectric element 77. This fuel is then supplied, via the fuel exhaust passage 89 and the check valve 90, to the fuel supply port 20. As shown in FIG. 3, when the plunger 12 is located at the upper position, fuel is supplied from the fuel supply port 20 to the fuel pressure chamber 15. Therefore, at this time, the pressure within the fuel pressure chamber 15 is at a low level of about 2 to 'kg/cm$^2$. Further, at this time, the piezoelectric element 77 is located at the maximum contracted position, and the fuel pressure within the variable volume chamber 78 and the pressure control chamber 66 is at a low level of about 2 to 3 kg/cm$^2$. Therefore, the overflow valve 31 is moved to the right in FIGS. 1 and 2 by the spring force of the compression spring 45, so that the ring-shaped valve portion 40 is separated from the valve seat 35. That is, the overflow valve 31 is opened. Therefore, on one hand, fuel at a low pressure in the fuel pressure chamber 15 is supplied, via the fuel overflow passage 50 and the pressurized fuel introducing chamber 41, to the fuel overflow chamber 42, and on the other hand, the above-mentioned fuel is supplied, via the fuel passage 52 and 51, the overflow valve back-pressure chamber 44, and the fuel passages 47 and 46 of the overflow valve 31, to the fuel overflow chamber 42. Fuel supplied to the overflow chamber 42 is expelled from the fuel exhaust passage 53. Therefore, at this time, the pressurized fuel introducing chamber 41, the fuel overflow chamber 42, and the overflow valve back-pressure 44 are filled with fuel having a low pressure of about 2 to 3 kg/cm$^2$.

Next, when the plunger 12 descends, although the fuel supply port 20 and the fuel port 21 are closed by the plunger 12, the overflow valve 31 is opened so that fuel in the fuel pressure chamber 15 is expelled via the fuel overflow passage 50 and the pressurized fuel introducing chamber 41 of the overflow valve 22 to the fuel overflow chamber 42. Therefore, also in this case, the fuel pressure in the fuel pressure chamber 15 is at a low level of about 2 to 3 kg/cm$^2$.

Next, when the piezoelectric element 77 is charged, to initiate a fuel injection, the piezoelectric element 77 is axially expanded, so that the piston 73 is pushed down to rapidly increase the fuel pressure within the variable volume chamber 78 and the valve chamber 67a. At this time, since the valve member 67d is seated on the valve seat 67b, fuel at a high pressure in the valve chamber 67 is spilled via the throttle passage 67e to the pressure control chamber 66. As a result, the fuel pressure in the pressure control chamber 66 is increased at a lower rate than the fuel pressure in the variable volume chamber 78 and the valve chamber 67a. When the fuel pressure in the pressure control chamber 66 is increased at such a low rate, the rod 60 is moved to the left at a low rate, and accordingly, the overflow valve 31 is also moved to the left at a low rate, so that the ring-shaped valve portion 40 of the overflow valve 31 abuts against the valve seat 35 at a low rate to close the overflow valve 31. Thus, since the overflow valve 31 abuts against the valve seat 35 at a low rate, bouncing of the overflow valve 31 at the valve seat 35 cannot occur. Therefore, once the overflow valve 31 is closed, this valve is held in the closed state. Also, since the rod 60 is also moved at a low rate, when the overflow valve 31 abuts against the valve seat 35, the rod 60 is not separated from the overflow valve 31. Therefore, since the fuel pressure in the pressure control chamber 66 is still applied to the valve member 31, the overflow valve 31 is held in the closed state. When the overflow valve 31 is closed, the fuel pressure within the fuel pressure chamber 15 is rapidly increased by the descending motion of the plunger 12, and as a result, when the fuel pressure in the fuel pressure chamber 15 becomes higher than a predetermined pressure, such as 1500 kg/cm$^2$, the needle 7 is opened to inject fuel from the nozzle hole 3. At this time, although a high pressure of fuel is also applied via the fuel overflow passage 50 to the pressurized fuel introducing chamber 41 of the overflow valve 31, such a high pressure of fuel does not operate the overflow valve 31 since the area for receiving the fuel pressure is the same on both sides of the pressurized fuel introducing chamber 41.

Next, when the piezoelectric element 77 is discharged, to complete a fuel injection, the piezoelectric element 77 is contracted. As a result, since the piston 73 is moved upward by the spring force of the compression spring 81, the fuel pressures within the variable volume chamber 78 and the valve chamber 67a are reduced. When the pressure of the valve chamber 67a is reduced, the pressure of the pressure chamber 66 becomes higher than the pressure of the valve chamber 67a, the valve member 67d is rapidly separated from the valve seat 67b, and accordingly, the pressure of the pressure control chamber 66 is rapidly reduced at approximately the same rate as for the variable volume chamber 78 and the valve chamber 67a. As explained above, the mass of the rod 60 and the overflow valve 31 is small, and therefore, when the pressure in the pressure control chamber 66 is reduced, the rod 60 and the overflow valve 31 are rapidly moved to the right in FIGS. 1 and 2 by the spring force of the compression spring 45, so that the ring-shaped valve portion 40 of the overflow valve 31 is separated from the valve seat 35 to rapidly open the overflow valve 31. When the overflow valve 31 is opened, high pressure fuel in the fuel pressure chamber 15 is injected, via the fuel overflow passage 50 and the pressurized fuel introducing chamber 41, to the fuel overflow chamber 42, so that the fuel pressure in the fuel pressure chamber 15 is rapidly reduced. Further, the volume of the fuel overflow chamber 42 is so small that the fuel pressure of the fuel overflow chamber 42 becomes temporarily high when pressurized fuel is injected into the fuel overflow chamber 42. As explained above, since the second ring-shaped fitting portion 39 is formed between the end surface 48 of the large-radius portion 37 of the overflow valve 31 and the fuel overflow chamber 42, a high pressure of fuel generated within the fuel overflow chamber 42 does not act on the end face of the large-radius portion 37 of the overflow valve 31. As a result, the high pressure generated in the fuel overflow chamber 42 acts only on the area between the cross-section of the large-radius hole of the slidable hole 30 and that of the small-radius hole 32 toward the opening direction of the overflow valve 31. Thus, the overflow valve 31 is activated to move in the opening direction by the high pressure generated in the fuel overflow chamber 42. Also, when high pressure fuel is injected into the fuel overflow chamber 42, a part of this fuel is injected from the fuel passage 47 via the fuel passage 46 of the overflow valve 31 to the overflow valve back-pressure chamber 44. Thus, when high pressure fuel is injected from the fuel passage 47, an opening activation force is applied by the reaction of the injection operation to the overflow valve 31 to open. Also, when the high pressure fuel is injected into the overflow valve back-pressure chamber 44, the pressure in the chamber 44 is increased so that an opening activation force is also applied to the overflow valve 31 by the fuel pressure of the chamber 44. Thus, when the overflow valve 31 is opened, an opening activation force is applied thereto by the increase of pressure in the fuel overflow chamber 42, the injection operation from the fuel passage 47, and the increase of pressure in the overflow valve back-pressure chamber 44. Therefore, immediately after the ring-shaped valve portion 40 is separated from the valve seat 35, the overflow valve 31 is rapidly opened. Further, once the overflow valve 31 is opened, this open state of the overflow valve 31 is held. Therefore, when the overflow valve 31 is opened, the fuel pressure in the fuel pressure chamber 15 is continuously reduced and accordingly, when the overflow valve 31 is opened, the needle 7 rapidly descends to stop the fuel injection. Also, when the engine speed or the engine load, becomes larger, the pressure of the pressurized fuel in the fuel pressure chamber 15 becomes higher, and therefore, the increase of the pressure in the fuel overflow chamber 42 is large when the overflow valve 31 is opened. Further, at this time, the fuel injection operation from the fuel passage 47 is strong, to enlarge the increase of the overflow valve back-pressure chamber 44. Therefore, when the engine speed or the engine load is larger, the opening activation force for the overflow valve 31 is stronger. Furthermore, to open the overflow valve 31, when the piezoelectric element 77 is contracted to reduce the fuel pressure of the variable volume chamber 78, low-pressure fuel is supplied to the variable volume chamber 78 if the pressure of the variable volume chamber 78 is lower than that of the fuel inlet passage 87 (FIG. 5).

Next, when the plunger 12 further descends, the circumferential groove 26 formed on the outer circumference of the plunger 12 is connected to the fuel supply port 20 and the fuel port 21. At this time, although the overflow valve 31 is usually open, when the overflow 31 is closed for some reason, the pressure in the fuel pressure chamber 15 is still high. Therefore, the circumferential groove 26 is connected to the fuel supply port 20 and the fuel port 21, and high pressure fuel in the fuel pressure chamber 15 is injected, via the fuel relief valve 27 and the circumferential groove 26, to the fuel supply port 20 and the fuel port 21. At this time, the high pressure fuel injected into the fuel supply port 20 and the fuel port 21 cannot flow into the cooling chamber 80, due to the check valve 90, and thus flows, via the fuel passages 51 and 52, to the overflow valve back-pressure chamber 44, and further flows, via the fuel passages 46 and 47, to the fuel overflow chamber 42. As a result, when the overflow chamber 44, and the fuel overflow chamber 42 are at a high pressure, a large opening force is applied to the overflow valve 31, and thus this overflow valve 31 is forcibly opened, therefore, the circumferential groove 26 serves as a fail-safe to prevent a closing of overflow valve 31 for some reason.

Next, the plunger 12 rises to the upper position thereof, and again descends, whereby a strong downward drive force is applied to the plunger 12, so that the fuel presume of the fuel pressure 15 becomes higher than 1500 kg/cm$^2$. Nevertheless, since the slidable hole 30 is arranged on the side of the plunger 12, the slidable hole 30 cannot be distorted, thus ensuring a smooth sliding operation of the overflow valve 31. Also, since the slidable hole 30 is arranged traversely to the plunger 12, the slidable hole 30 can be positioned close to the fuel pressure chamber 15, and as a result, the fuel overflow passage 50 can be shortened, and accordingly, the volume of the fuel pressure chamber 15 can be reduced. Therefore, since the fuel pressure in the fuel pressure chamber 15 can be easily made high, a good atomization of injected fuel can be obtained. Further, since the volume of the fuel pressure chamber 15 can be small, when the overflow value 31 is opened, the fuel pressure in the fuel pressure chamber 15 is rapidly reduced to promptly stop a fuel injection. Therefore, after the overflow valve 31 is opened, the generation of smoke can be suppressed since a fuel injection cannot continue under a low pressure state. Also, the output of the engine can be improved, and the fuel consumption can be improved. Further, since the fuel injection amount rapidly rises and ends in response to the opening/closing operation of the overflow valve 31, an excellent pilot injection can be carried out.

Also, the width of the unit injector can be shortened by forming the slidable hole 30 traversely on the side of the plunger 12. Furthermore, the width of the unit injector can be further shortened by arranging the axial line of the piezoelectric element 77 perpendicular to the coaxial line of the slidable hole 30 and the rod 69, i.e., in parallel with the coaxial line of the plunger 12 and the needle 7.

To initiate a fuel injection, since the pressure within the pressure control chamber rises at a low rate, the overflow valve is moved in the closing direction at a low rate. Therefore, bouncing of the overflow valve at the valve seat cannot occur, and once the overflow valve is seated on the valve seat the overflow valve remains closed, thus securely closing the overflow valve. As a result, the fuel injection pressure smoothly rises to a high pressure, and an excellent fuel injection can be carried out. Also, to stop a fuel injection, since the pressure in the pressure control chamber is rapidly reduced, so that the overflow valve is rapidly opened, a clean cut-off of the fuel is obtained.

The above-mentioned fuel injection apparatus including the pressure control mechanism is further improved by providing an electrical apparatus for driving the piezoelectric element 77 according to the present invention, as now explained.

Figure 8:
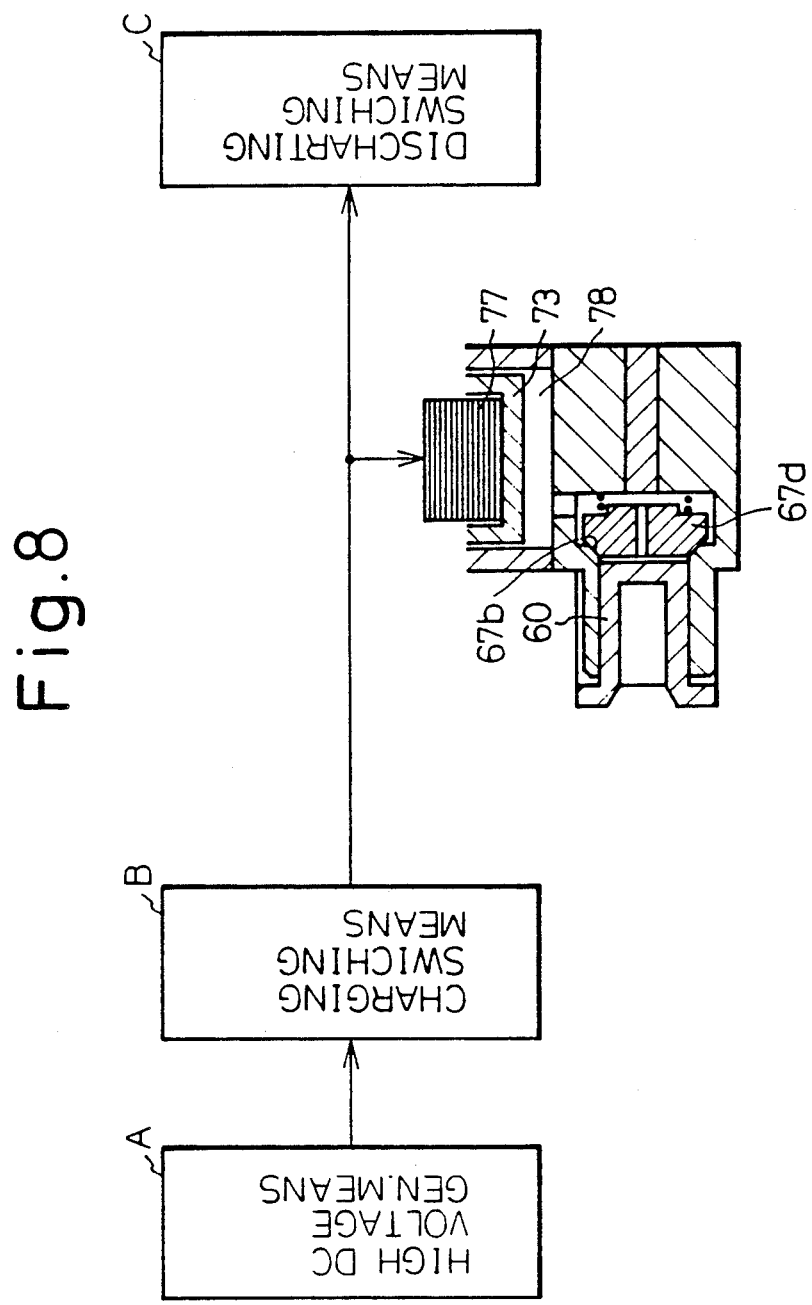
FIG. 8 is a block diagram schematically illustrating a general apparatus for driving the piezoelectric of FIGS. 1 through 7.

In FIG. 8, which illustrates a general apparatus for driving the piezoelectric element 77 of FIGS. 1 through 7, a charging switching means B receives a DC output of a high DC voltage generating means A, to apply a high DC voltage to the piezoelectric element 77, thereby expanding the piezoelectric element 77. As a result, the valve member 67 is sealed on the valve seat 67b, and therefore, the valve is closed. Contrary to this, a discharging switching means C discharges the piezoelectric element 77, thereby contracting the piezoelectric element 77, and as a result, the valve member 67d is separated from the valve seat 67d, and therefore, the valve is opened.

Figure 9:
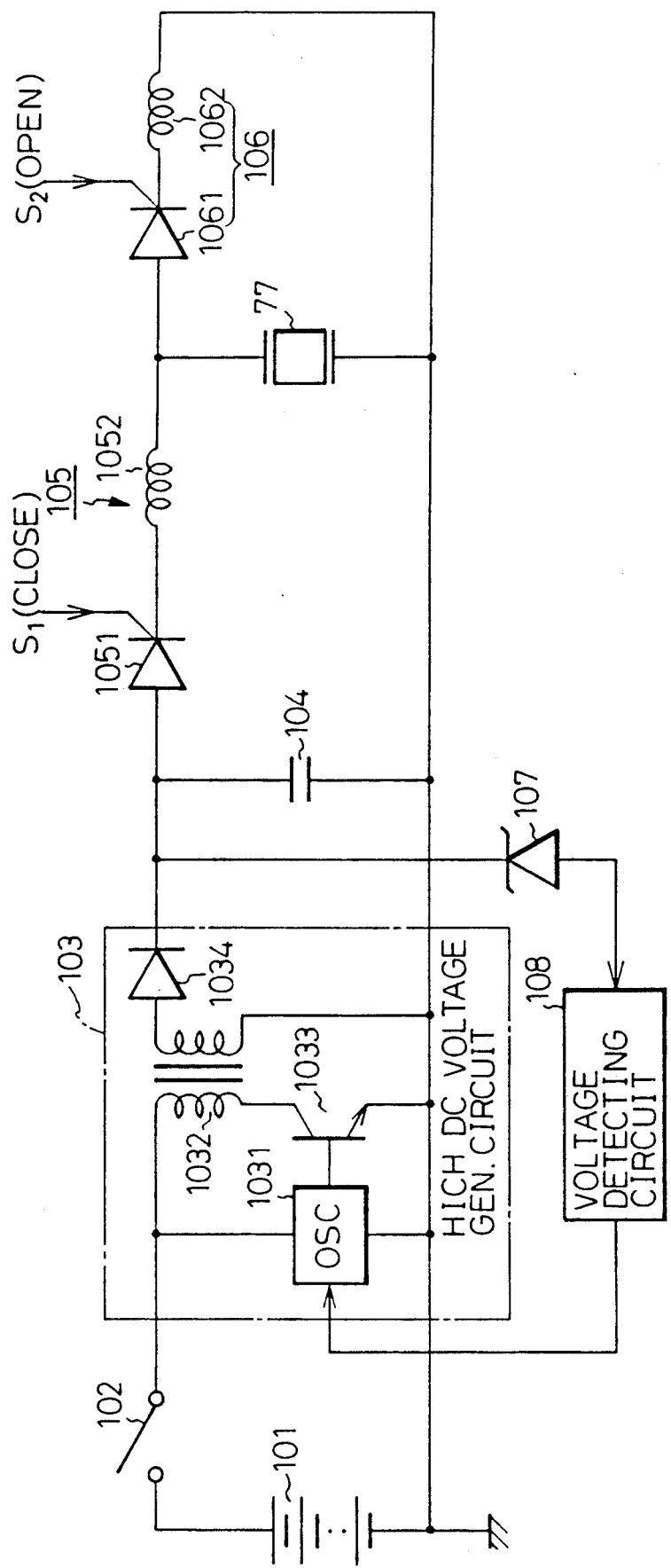
FIG. 9 is a circuit diagram illustrating a prior art apparatus for driving a piezoelectric element.

A known apparatus for driving the piezoelectric element 77 of FIG. 8, is shown in FIG. 9. In FIG. 9, 101 designates a 12 V battery which supplies power via an ignition switch 102 to a high voltage generating circuit 103. This light voltage generating circuit 103 converts the battery voltage 12 V into a voltage of 300 V on the like and applies it to a condenser 104.

The high voltage generating circuit 103 is formed by a high frequency oscillation circuit 1031, a step-up transformer 1032 as a step-up circuit, a transistor 1033 for turning ON and OFF the primary coil of the step-up transformer 1032, and a diode 1034 for supplying a positive voltage generated in the secondary coil of the step-up transformer 1032 to a condenser 104.

Also, a thyristor 1051 and a coil 1052 are provided as a charging switching circuit means 105, and a thyristor 1061 and a coil 1062 are provided as a discharging switching circuit (means) 106. The thyristor 1051 is turned ON by a valve closing ignition signal (pulse) S$_1$, and the thyristor 1061 is turned ON by a valve opening ignition signal (pulse) S$_2$.

The coil 1052 is used for forming on LC oscillation circuit. Therefore, when the thyristor 1051 is turned ON, an LC oscillation circuit is formed by the condenser 104, the coil 1052 and the piezoelectric element 77, thereby enhancing the reduction of the voltage of the condenser 104 and the increase of the voltage of the piezoelectric element 77. Thereafter, the thyristor 1051 is turned OFF by natural commutation.

The coil 1062 is also used for forming an LC oscillation circuit. Therefore, when the thyristor 1061 is turned ON, an LC oscillation circuit is formed by, the coil 1062 and the piezoelectric element 77, thereby enhancing the reduction of the voltage of the piezoelectric element 77. Thereafter, the thyristor 1061 is turned OFF by natural commutation. As a result, the discharged voltage of the piezoelectric element 77 becomes lower than the earth voltage (0 V); for example, is −200 V.

Reference 107 is a Zener diode, and a voltage detecting circuit 108 detects that the charged voltage of the condenser 104 is higher than a voltage determined by the Zener diode 107, to suppress the driving of the high frequency oscillation circuit 1031. That is, the charged voltage of the condenser 104 is defined as a predetermined value.

In the driving apparatus of FIG. 9, when a valve closing signal S$_1$ is output as shown in FIG. 10A, the charged voltage of the piezoelectric element 77 is rapidly increased, and therefore, the displacement speed of the piezoelectric element 77 is also rapidly increased. As a result, since a fuel pressure is present as a displacement amplification mechanism in the variable volume chamber 78, the pressure P of the fuel-variable volume chamber 78 is rapidly increased before the valve member 67d is moved. Accordingly, a peak value (such as 800 V) is generated in the charged voltage by the reaction of the element 77, and simultaneously, since the valve member 67d receives a repulsive force corresponding to the above-mentioned pressure P of the variable volume chamber 78 and the displacement speed thereof is very large. As a result, when the valve member 67d is seated on the valve seat 67b, the valve member 67d receives a large repulsive force therefrom, thus creating a bounce of the overflow valve 31 as indicated by an arrow X. When a bounce occurs, the linear characteristic of the fuel injection amount to the time is reduced, and vibration of the injection rate at an initial stage of an injection and a reduction of the pressure of an injection, and the like, are invited.

Note that, to avoid the above-mentioned bounce, there is known a driving apparatus wherein a charging voltage is applied by two stages to the piezoelectric element (see; Unexamined Japanese Patent Publication (Kokai) No. 62-142845). That is, when the valve member 67d is moved a 70 per cent distance along a full stroke, the applied voltage to the piezoelectric element 77 is temporarily made 0, and thereafter, the applied voltage is restored. This is helpful where the displacement of the piezoelectric element 77 is transmitted via an elastic member, a spring, or the like to the piezoelectric element 77, but not where the displacement of the piezoelectric element 77 is transmitted via a liquid (fuel) to the valve member 67d. In the latter case, the inversion of the applied voltage to 0 V implies that the valve member 67d is moved toward the opposite direction, so that it is impossible to close the valve member 67d, and thus this does not help to avoid the above-mentioned bounce.

Figure 11:
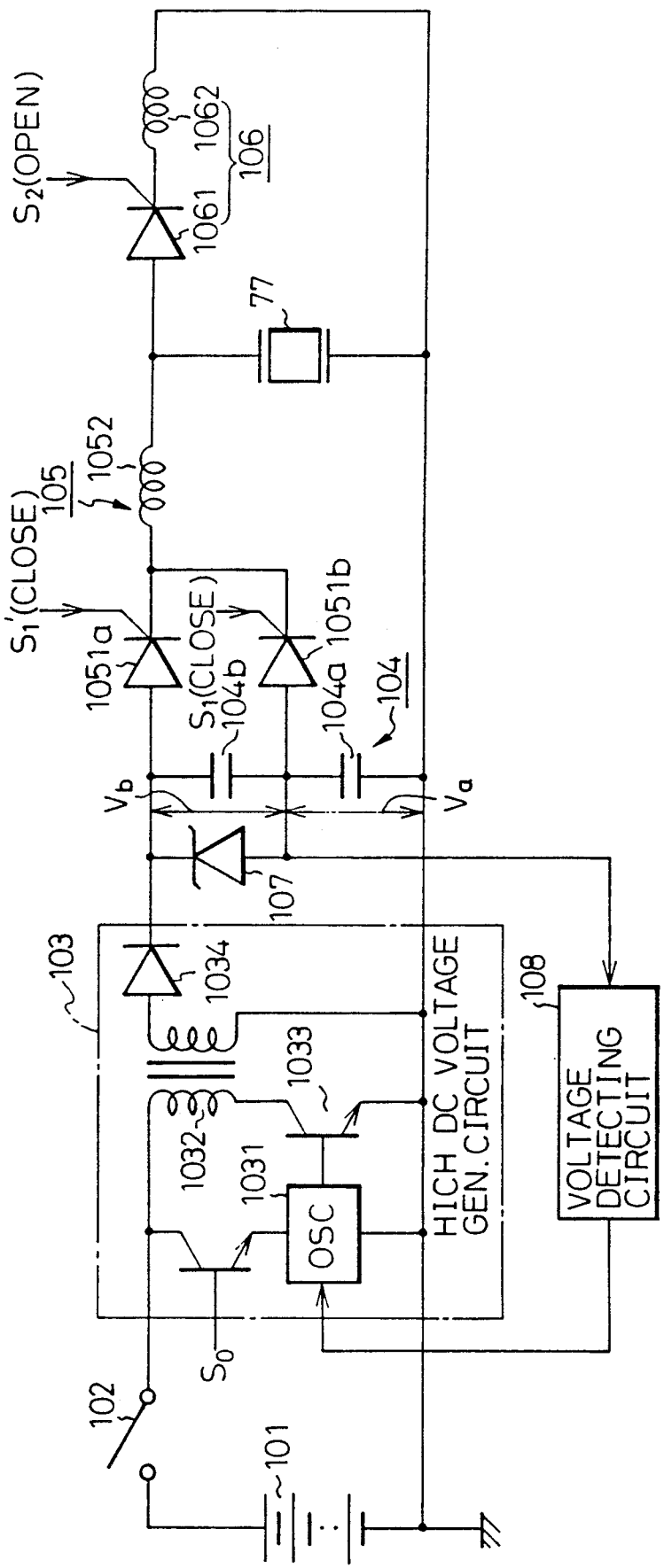
FIG. 11 is a circuit diagram illustrating a first embodiment of the apparatus for driving a piezoelectric element according to the present invention.

In FIG. 11, which illustrates a first embodiment of the apparatus for the driving a piezoelectric element according to the present invention, a first-stage charging condenser 104a and a second-stage charging condenser 104b are provided instead of the condenser 104 of FIG. 9, and thyristors 1051a and 1051b are provided in the charging switching circuit 105. Note that the voltage detecting circuit 108 monitors the voltage of the second-stage charging condenser 104b to define the operation of the high frequency oscillation circuit 1031.

Figure 13:
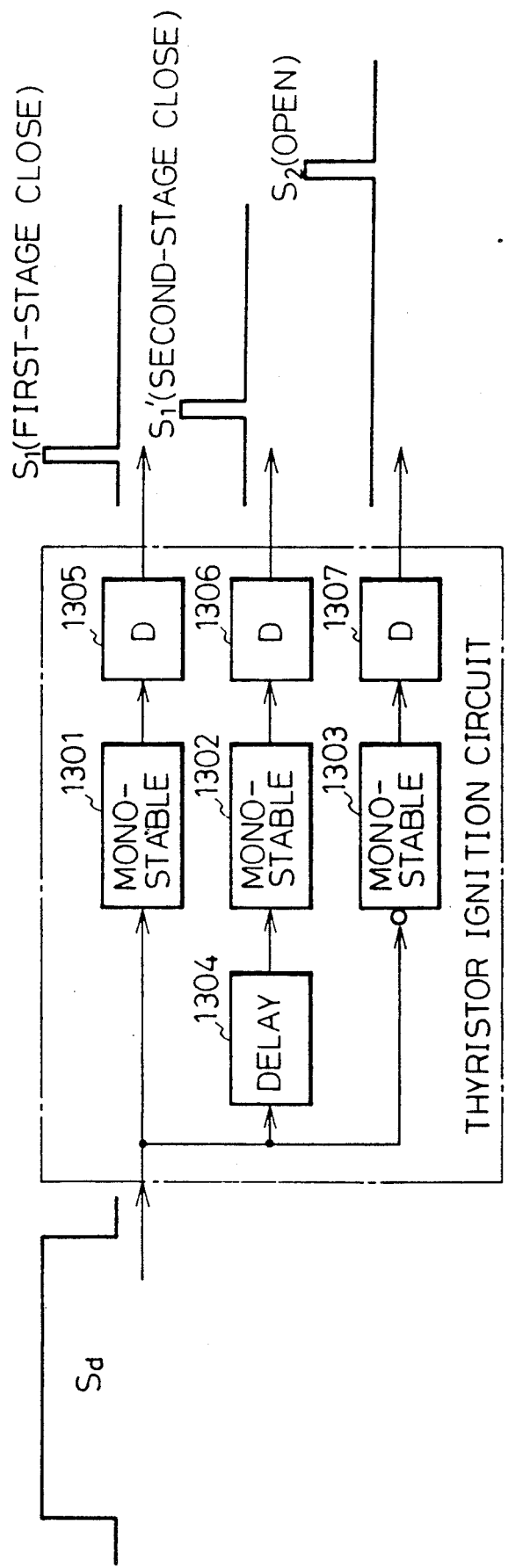
FIG. 13 is a circuit diagram of an ignition circuit for generating the ignition signals of FIG. 11.
Figure 14:
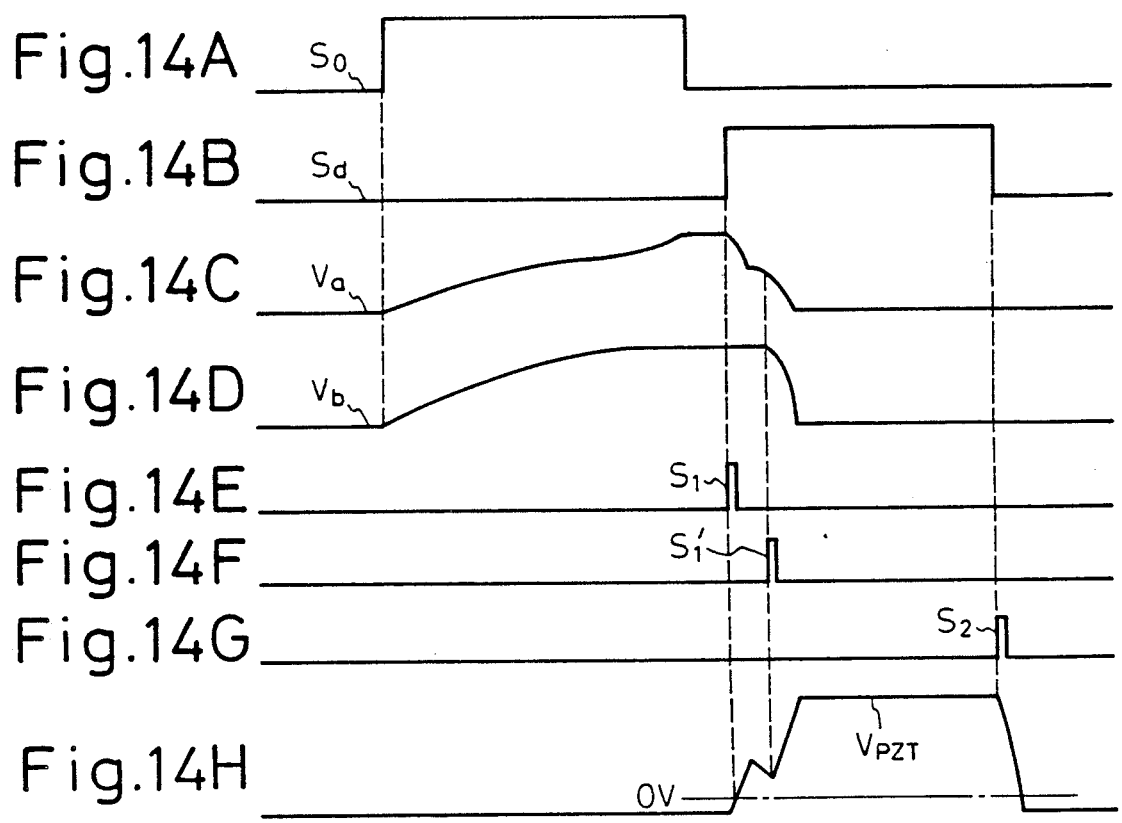
FIGS. 14A through 14H are timing diagrams showing the operation of the circuit of FIG. 13.

In FIG. 11, since three thyristors, i.e., the first-stage valve closing thyristor 1051a, the second-stage valve closing thyristor 1051b, and the valve opening thyristor 1061, are present, a thyristor ignition circuit as illustrated in FIG. 13 is provided in the control circuit (microcomputer, not shown). That is, the thyristor ignition circuit is comprised of three mono-stable multivibrators 1301 to 1303, a delay circuit 1304, and three driven circuits 1305 to 1307. Here, the mono-stable multivibrator 1301 generates a pulse having a definite duration at every rise of a piezoelectric element driving signal $S_d$ generated in the control circuit, to turn ON the driver circuit 1305 and thereby generate a first-stage valve closing ignition signal $S_1$. Also, the mono-stable multivibrator 1302 generates a pulse having a definite duration at every rise of the delayed piezoelectric element driving signal $S_d$ by the delay circuit 1304, to turn ON the driver circuit 1306 and thereby generate a second-stage valve closing ignition signal $S_1'$. Further, the mono-stable multivibrator 1303 generates a pulse having a definite duration at every fall of a piezoelectric element driving signal $S_d$ to turn ON the driven circuit 1307 and thereby generate a valve opening ignition signal $S_2$.

The operation of the circuit of FIG. 11 will be explained with reference to FIGS. 12A through 12F.

Before the charging operation of the piezoelectric element 77, the high voltage generating circuit 103 is operated by a charging signal $S_0$, and a high voltage is capacitively divided by the two condensers 104a and 104b and accumulated therein. In the high frequency generating circuit 103, the transistor 1033 is turned ON and OFF by the pulse signal of the high frequency oscillation circuit 1031, a primary current flows through the primary coil of the step-up transformer 1032 when the transistor 1033 is turned ON, and accordingly, magnetic flux energy is accumulated in the core of the transformer. Next, when the transistor 1033 is changed from an ON state to an OFF state, the above-mentioned accumulated magnetic flux energy appears as a generated voltage, such as 300 V, in the secondary coil of the stop-up transformer 1032, when the pulse duration of the pulse signal of the high frequency oscillation circuit 1031 is definite, this generated voltage is definite. This generated voltage is accumulated via the diode 1034 in the condensers 104a and 104b, and after a certain time has passed, the voltage of the condensers 104a and 104b becomes equal to the generated voltage 300 V of the secondary coil of the step-up transformer 1032. At this time, this generated voltage 300 V is capacitively divided by the condensers 104a and 104b, and as a result, the terminal voltages $V_a$ and $V_b$ of the condensers are as follows.

$$V_a = \frac{C_b}{C_a + C_b} \cdot 300 \text{ V}$$

$$V_b = \frac{C_a}{C_a + C_b} \cdot 300 \text{ V}$$

where $C_a$ and $C_b$ are capacitances of the condensers 104a and 104b, respectively, Next, when the first-stage valve closing signal $S_1$ is generated, the thyristor 1051a is turned ON, so that an LC oscillation circuit is formed by the condenser 104a, the coil 1052, and the piezoelectric element 77. Thus, charges accumulated in the condenser 104a are moved to the piezoelectric element 77, to charge the element 77. In this case, due to the presence of the above-mentioned LC oscillation circuit the terminal voltage $V_{PZT}$ of the piezoelectric element 77 becomes higher than the final voltage of the condenser 104a, and thereafter, the thyristor 1051a is turned ON by natural commutation. As a result, the piezoelectric element 77 is charged at the first predetermined voltage (350 V), so that the valve member 67d of FIG. 8 is displaced toward the valve seat 67b. Therefore, the pressure P of the variable volume chamber 78 is rapidly increased, and thereafter is decreased, due to the displacement of the valve member 67d. In this case, however, since the first predetermined voltage is so low that the valve member 67d can reach the valve seat 67b, the peak value of P is small, and the striking force (initial generated force) of the valve member 67d is also small, thereby suppressing the motion speed of the valve member 67d. At this time, the terminal voltage $V_{PZT}$ of the piezoelectric element 77 is increased, and thereafter, is decreased, by the reaction of the pressure P, but also in this case, the peak value thereof is small.

Next, when a predetermined time such as 200 μs has passed, so that the valve member 67d reaches the periphery of the valve seat 67b, the second-stage valve closing ignition signal $S_1'$ is generated, to turn ON the thyristor 1051b. As a result, an LC oscillation circuit is formed by the condenser 104b, the coil 1052, and the piezoelectric element 77, and therefore, the charges of the condenser 104b are moved to the piezoelectric element 77 which is further charged to obtain a required applied voltage of 800 V. In this case, due to the presence of the above-mentioned LC oscillation circuit, the terminal voltage $V_{PZT}$ of the piezoelectric element 77 becomes higher than the sum of the voltages of the condensers 104a and 104b, and thereafter, the thyristor 1051b is turned OFF by natural commutation. As a result, the valve member 67d reaches the valve seat 67b at a lower rate compared with the case where 800 V is applied by one stage to the element 77. In addition, the generated force of the piezoelectric element 77 is the maximum, when the valve member 67d is seated on the valve seat 67b in the same way as in the prior art, and therefore, the valve member 67d can reach the valve seat 67b with a valve closing force of 800 V, without bounce.

In the above-mentioned state, after a predetermined time has passed, the valve opening ignition signal $S_Q$ is generated and the thyristor 1061 is turned ON, so that an LC oscillation circuit is formed by the piezoelectric element 77 and the coil 1062. Thus charges accumulated in the piezoelectric element 77 are discharged. In this case, due to the presence of the above-mentioned LC oscillation circuit, the terminal voltage $V_{PZT}$ of the piezoelectric element 77 becomes lower than 0 V, for example, becomes $-150$ V, and thereafter, the thyristor 1061 is turned OFF by natural commutation. Thus, the valve member 67d reaches the valve seat 67b at a lower rate, compared with the case where the voltage of 800 V is applied by one stage. In addition, the generated force of the piezoelectric element 77 at the time of seating on the valve seat 67b is the same as that of the prior art. Therefore, the valve member 67d can reach the valve seat 67b at the valve closing force of the second predetermined voltage 800 V without generating ounce. That is, the valve closing force is the same only when the final applied voltage is the same, regardless of whether the charging is one-stage or two-stage.

The increase of P due to the delay of the displacement of the valve 67d is absorbed by the motion of the valve member 67d during a first stage charging mode. At a second stage charging mode of 800 V, there is no vibration of voltage by the reaction of the fuel pressure due to the response delay of the motion of the valve member 67d, and the peak value of the terminal voltage $V_{PZT}$ of the piezoelectric element 77 almost coincides with the flat value thereof. Accordingly, when the peak value the terminal voltage $V_{PZT}$ of the piezoelectric element 77 is definite, i.e., when the withstanding voltage of the piezoelectric element 77 is the same, the flat value (corresponding to the applied voltage) of the terminal voltage after the completion of charging can be increased compared with the one-stage charging type. Therefore, it is possible to further suppress bounce by generating a larger valve closing force.

Figure 15:
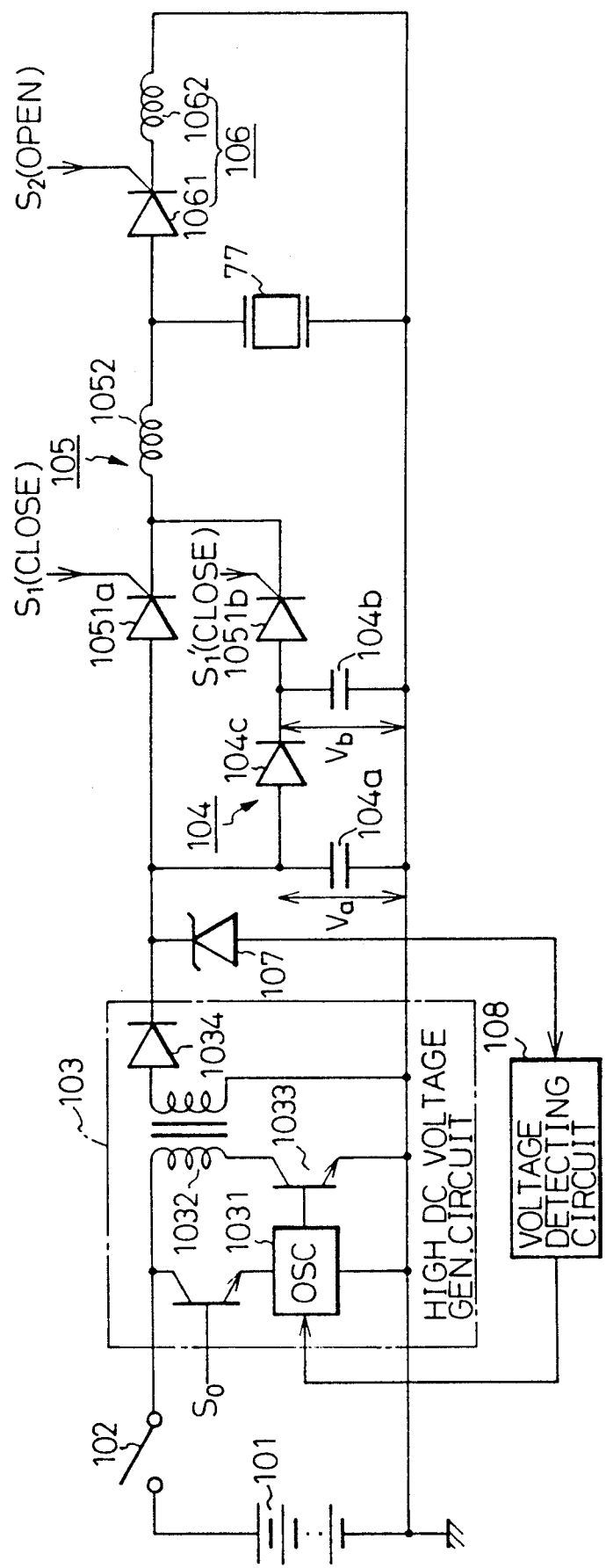
FIG. 15 is a circuit diagram illustrating a second embodiment of the apparatus for driving a piezoelectric element according to the present invention.
Figure 16:
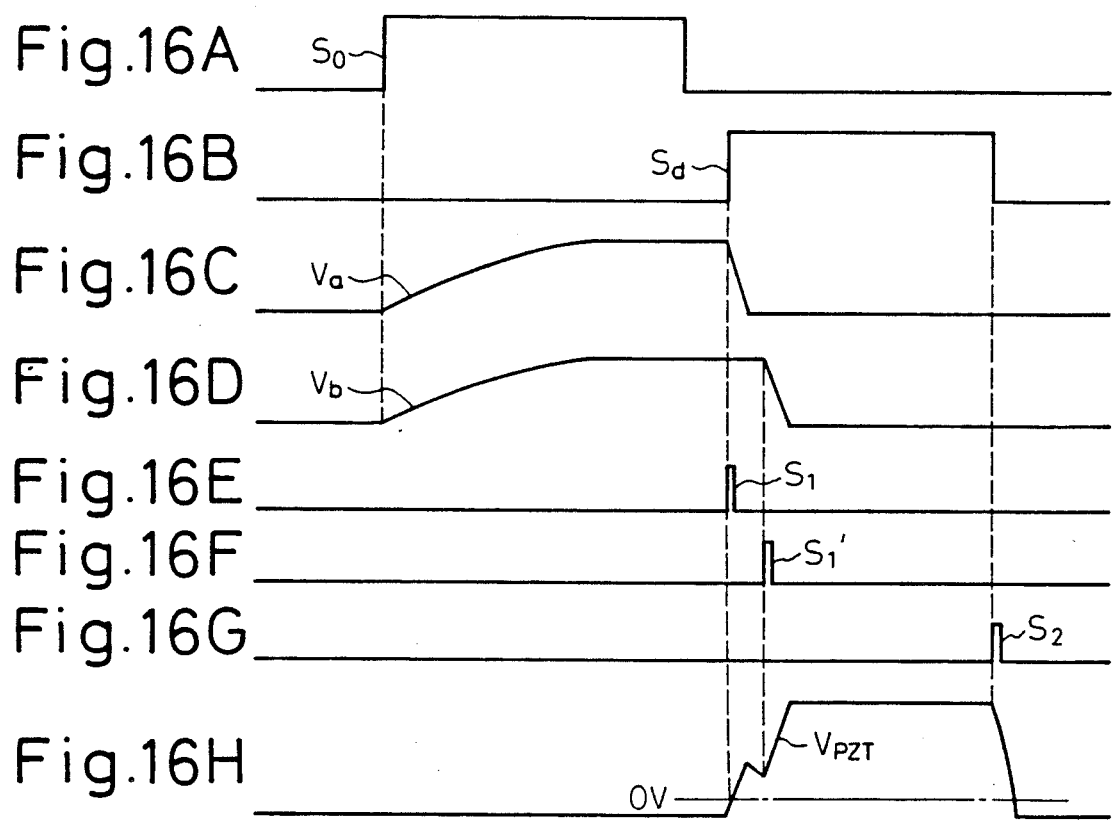
FIGS. 16A through 16H are timing diagrams showing the operation of the circuit of FIG. 15.

FIG. 15 illustrates a second embodiment of the apparatus for driving a piezoelectric element according to the present invention, different from FIG. 11 in that the first-stage charging condenser 104a and the second-stage charging condenser 104b are connected in parallel, and therefore, the condensers 104a and 104b are charged at approximately the same voltage. Note that a diode 104c is used to avoid a reverse current. That is, the terminal voltages $V_a$ and $V_b$ of the condensers 104a and 104b are as follows:

$$V_a = V_b = 300 \text{ V}$$

The operation of the circuit of FIG. 15 will be explained with reference to FIGS. 16A through 16H.

Before the charging operation of the piezoelectric element 77, the high voltage generating circuit 103 is operated by a charging signal $S_0$, and a high voltage is capacitively simultaneously accumulated in the two condensers 104a and 104b.

Next, when the first-stage valve closing ignition signal $S_1$ is generated, the thyristor 1051a is turned ON, so that an LC oscillation circuit is formed by the condenser 104a, the coil 1052, and the piezoelectric element 77, and thus charges accumulated in the condenser 104a are moved to the piezoelectric element 77, to charge the element 77. In this case, due to the presence of the above-mentioned LC oscillation circuit the terminal voltage $V_{PZT}$ of the piezoelectric element 77 becomes higher than the final voltage of the condenser 104a, and thereafter, the thyristor 1051a is turned OFF by natural commutation.

Next, when a predetermined time has passed so that the valve member 67d reaches the periphery of the valve seat 67b, the second-stage valve closing ignition signal $S_1'$ is generated to turn ON the thyristor 1051b. As a result, an LC oscillation circuit is formed by the condenser 104b, the coil 1052, and the piezoelectric element 77, and therefore, the charges of the condenser 104b are moved to the piezoelectric element 77, which is further charged. In this case, due to the presence of the above-mentioned LC oscillation circuit, the terminal voltage $V_{PZT}$ of the piezoelectric element 77 becomes higher than the voltage of the condenser 104b, and thereafter, the thyristor 1051b is turned OFF by natural commutation.

In the above-mentioned state, after a predetermined time has passed, the valve opening ignition signal $S_2$ is generated and the thyristor 1061 is turned ON, so that an LC oscillation circuit is formed by the piezoelectric element 77 and the coil 1062, thus charges accumulated in the piezoelectric element 77 are discharged. In this case, due to the presence of the above-mentioned LC oscillation circuit, the terminal voltage $V_{PZT}$ of the piezoelectric element 77 becomes lower than 0 V, for example, becomes $-150$ V, and thereafter the thyristor 1061 is turned OFF by natural commutation.

Thus, also in the second embodiment, the charging voltage of the piezoelectric element 77 is controlled in two-stages in the same way as in the first embodiment.

Figure 17:
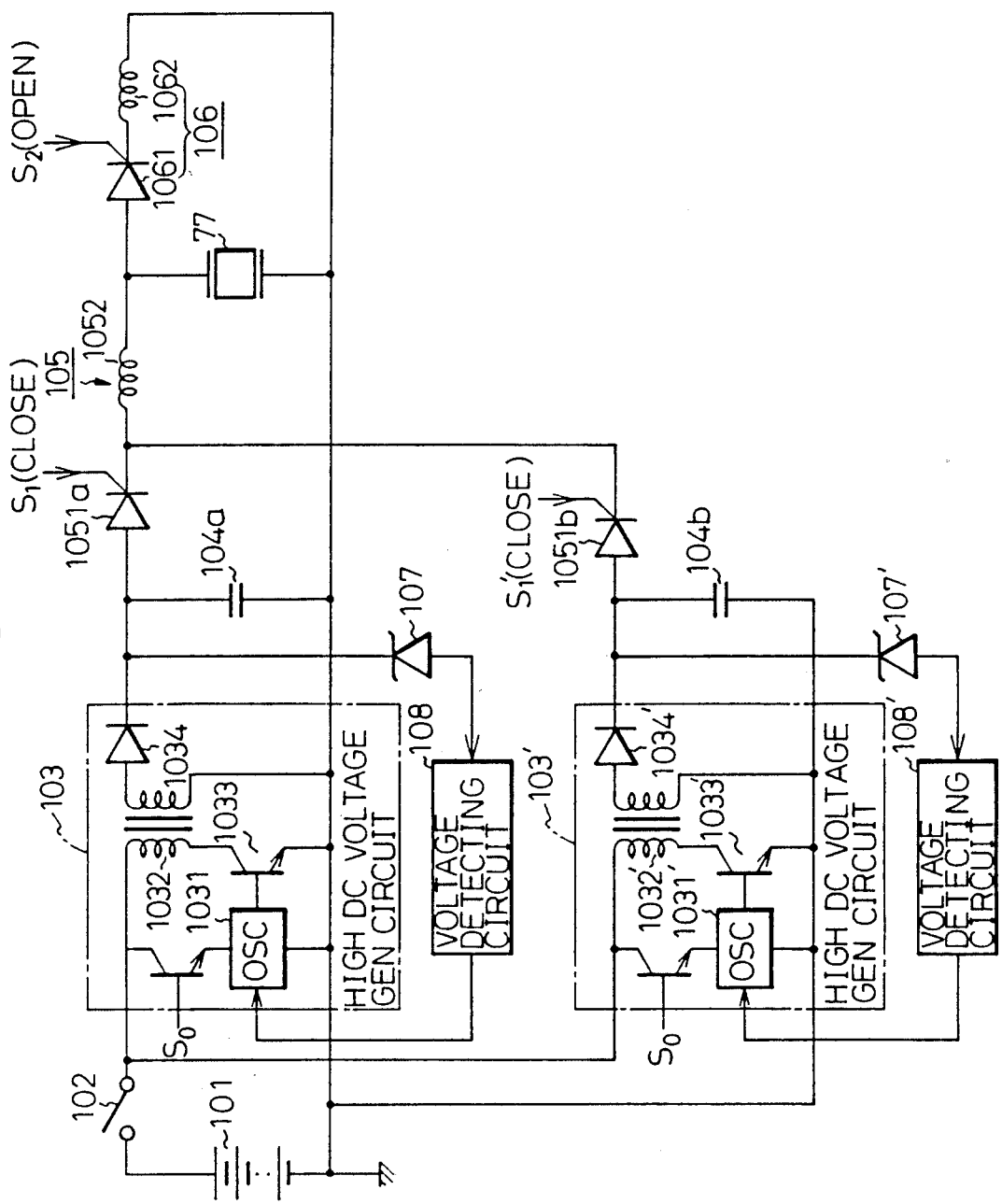
FIG. 17 is a circuit diagram illustrating a third embodiment of the apparatus for driving a piezoelectric element according to the present invention.

As shown in FIG. 17 which illustrates a third embodiment of the driving apparatus for a piezoelectric element according to the present invention, the first-stage charging condenser 104a and the second-stage charging condenser 104b are charged by two separate high voltage generating circuits 103 and 103'. In this case, although the apparatus is larger compared with those of the first and second embodiments, there is an advantage in that the charging power can be increased. Note that the operation of the circuit of FIG. 17 is almost the same as that of FIG. 15.

Note that the above-mentioned embodiments of FIGS. 11, 15, and 17 can be also applied to a fuel injection apparatus not provided with the pressure control mechanism of FIGS. 1 to 7.

As explained above, according to the driving apparatus of the present invention, since the voltage applied to the piezoelectric element 77 is increased by two-stages, bounce of the valve member can be avoided. Therefore, when the present invention is applied to a fuel injection valve, the reduction of linear characteristics of the fuel injection amount to the time, the vibration of the fuel injection rate at an initial stage of an injection, and the reduction of pressure of an injection, can be avoided.

We claim:

1. An apparatus for driving a piezoelectric element to transmit a displacement of said piezoelectric element via a liquid to a valve member, for closing and opening said valve member, comprising:
   a high DC voltage generating means; a charging switching means, connected to said high DC voltage generating means and said piezoelectric element, for generating a first voltage and applying said first voltage to said piezoelectric element for a predetermined time so that said valve member reaches a position near to a valve seat, and thereafter, increasing a voltage applied to said piezoelectric element from said first voltage to a second voltage higher than said first voltage so that said valve member is seated on said valve seat, to thereby close said valve; and
   a discharging switching means, connected to said piezoelectric element, for discharging charges stored in said piezoelectric element to open said valve.

2. An apparatus as set forth in claim 1, wherein said high DC voltage generating means comprises:
   a battery;
   a DC/DC converter, connected to said battery, for generating a DC output; and
   first and second condensers connected in series, and connected to said DC/DC converter, for accumulating the DC output thereof.

3. An apparatus as set forth in claim 2, wherein said charging switching means comprises:
   a first charging thyristor and a first coil connected in series between said first condenser and said piezoelectric element; and
   a second charging thyristor and a second coil connected in series between said second condenser and said piezoelectric element,
   an LC oscillation circuit being formed by said first condenser, said first coil, and said piezoelectric element, to generate said first voltage, when said first charging thyristor is turned ON by a first closing signal,
   an LC oscillation circuit being formed by said second condenser, said second coil, and said piezoelectric element, to generate said second voltage, when said second charging thyristor is turned ON by a second closing signal.

4. An apparatus as set forth in claim 3, wherein said first coil serves as said second coil.

5. An apparatus as set forth in claim 3, further comprising means, connected to said first or second condenser and to said DC/DC converter, for suppressing the operation thereof when the voltage of said first or second condenser is higher than a predetermined voltage.

6. An apparatus as set forth in claim 1, wherein said high DC voltage generating means comprises:
   a battery;
   a DC/DC converter, connected to said battery, for generating a DC output;
   first and second condensers connected in parallel and connected in parallel to said DC/DC converter, for accumulating the DC output thereof; and
   a reverse-current avoiding element connected between said first and second condensers.

7. An apparatus as set forth in claim 6, wherein said charging switching means comprises:
   a first charging thyristor and a first coil connected in series between said first condenser and said piezoelectric element; and
   a second charging thyristor and a second coil connected in series between said second condenser and said piezoelectric element,
   an LC oscillation circuit being formed by said first condenser, said first coil, and said piezoelectric element, to generate said first voltage, when said first charging thyristor is turned ON by a first closing signal,
   an LC oscillation circuit being formed by said second condenser, said second coil, and said piezoelectric element, to generate said second voltage, when said second charging thyristor is turned ON by a second closing signal.

8. An apparatus as set forth in claim 7, wherein said first coil serves as said second coil.

9. An apparatus as set forth in claim 6, further comprising means, connected to said first or second condenser and to said DC/DC converter, for suppressing the operation thereof when the voltage of said first or second condenser is higher than a predetermined voltage.

10. An apparatus as set forth in claim 1, wherein said high DC generating means comprises:
    a battery;
    first and second DC/DC converter, connected to said battery, for generating DC outputs; and
    first and second condensers, connected to said first and second DC/DC converters, respectively, for accumulating the DC output thereof.

11. An apparatus as set forth in clam 10, wherein said charging switching means comprises:
    a first charging thyristor and a first coil connected in series between said first condenser and said piezoelectric element; and
    a second charging thyristor and a second coil connected in series between said second condenser and said piezoelectric element,
    an LC oscillation circuit being formed by said first condenser, said first coil, and said piezoelectric element, to generate said first voltage, when said first charging thyristor is turned ON by a first closing signal,
    an LC oscillation circuit being formed by said second condenser, said second coil, and said piezoelectric element, to generate said second voltage, when said second charging thyristor is turned ON by a second closing signal.

12. An apparatus as set forth in claim 11, wherein said first coil serves as said second coil.

13. An apparatus as set forth in claim 10, further comprising:
    means, connected to said first condenser and to said first DC/DC converter, for suppressing the operation thereof when the voltage of said first second condenser is higher than a predetermined voltage; and means, connected to said second condenser and to said second DC/DC converter, for suppressing the operation thereof when the voltage of said second condenser is higher than a predetermined voltage.

14. An apparatus as set forth in claim 1, wherein said discharging switching means comprises:

a discharging thyristor and a coil connected in series and connected in parallel with said piezoelectric element, an LC oscillation circuit being formed by said coil and said piezoelectric element, to discharge the charges stored therein, when said discharging thyristor is turned ON by an opening signal.

* * * * *

UNITED STATES PATENT AND TRADEMARK OFFICE
CERTIFICATE OF CORRECTION

PATENT NO. : 5,057,734

DATED : October 15, 1991

INVENTOR(S) : Naoyuki TSUZUKI, et al.

It is certified that error appears in the above-identified patent and that said Letters Patent is hereby corrected as shown below:

Column 1, line 21, change "move" to --moving--.

Column 2, line 20, change "fine" to --line--.

Column 2, line 30, change "piezoelectric" to --piezoelectric element--.

Column 2, line 34, change "10B" to --10E--.

Column 4, line 25, change "y" to --by--.

Column 4, line 31, change "3" to --31--.

Column 4, line 41, change "4" to --44--.

Column 6, line 33, change "'kg/cm$^2$." to --3kg/cm$^2$.--.

Column 9, line 17, change "presume" to --pressure--.

Column 9, line 17, change "pressure 15" to --pressure chamber 15--.

Column 10, line 7, change "67" to --67d--.

Column 10, line 12, change "67d," to --67b,--.

Column 10, line 20, change "on" to --or--.

Column 10, line 35, change "on" to --an--.

Column 11, line 37, change "the driving a" to --driving a--.

Column 12, line 18, change "stop-up" to --step-up.--.

Column 13, line 41, change "ounce" to --bounce--.

UNITED STATES PATENT AND TRADEMARK OFFICE
CERTIFICATE OF CORRECTION

PATENT NO. : 5,057,734
DATED : October 15, 1991
INVENTOR(S) : Naoyuki TSUZUKI, et al.

It is certified that error appears in the above-identified patent and that said Letters Patent is hereby corrected as shown below:

Column 13, line 45, change "valve" to --valve member--.
Column 13, line 53, change "value the" to --value of the--.

In the Claims:

Column 16, line 37, change "converter," to --converters,--.
Column 16, line 66, change "first second" to --first--.

Signed and Sealed this

Thirteenth Day of July, 1993

Attest:

MICHAEL K. KIRK

Attesting Officer

Acting Commissioner of Patents and Trademarks